United States Patent

[11] 3,553,471

| [72] | Inventor | Robert J. Maigret<br>Warwick, R.I. |
|---|---|---|
| [21] | Appl. No. | 756,881 |
| [22] | Filed | Sept. 3, 1968 |
| [45] | Patented | Jan. 5, 1971 |
| [73] | Assignee | George Pesce<br>Warwick, R.I.<br>a part interest |

[54] AMBIENT-LIGHT-OPERATED BIN-LEVEL CONTROL SYSTEM HAVING TRANSPARENT PHOTOCELL HOUSING
7 Claims, 5 Drawing Figs.

[52] U.S. Cl. ................................................ 250/239,
 250/222, 250/237, 340/244, 350/188
[51] Int. Cl. ........................................................ G06m 7/00
[50] Field of Search .......................................... 250/221,
 222, 223, 218, 237, 239; 340/244; 356/215, 225,
 236; 350/167, 188

[56] References Cited
UNITED STATES PATENTS

| 1,370,885 | 3/1921 | Frederick et al. ............... | 350/188 |
| 2,381,505 | 3/1945 | Lindholm ....................... | 250/218 |
| 2,884,783 | 5/1959 | Spengler et al. ............... | 340/244 |
| 3,162,766 | 12/1964 | Ploke ............................ | 356/225 |
| 3,274,392 | 9/1966 | Harling ......................... | 250/239 |
| 3,222,959 | 5/1967 | Lorenz ......................... | 250/218 |
| 3,407,303 | 10/1968 | Konrad et al. ................ | 250/222 |
| 3,445,677 | 5/1969 | Leftwich ....................... | 250/218 |

*Primary Examiner*—James W. Lawrence
*Assistant Examiner*—Martin Abramson
*Attorney*—Salter & Michaelson ABSTRACT: A storage bin-level sensor device for sensing the level of material in the storage bin between certain upper and lower limits and for controlling flow of material into the bin for maintaining a predetermined level therein. Maintaining the level of material in the storage bin is attained by upper and lower bin level sensors of the photoelectric type, which operate in response to the presence or absence of ambient light. Each sensor comprises a transparent housing that has a recess formed therein, a photoresponsive device being mounted within the recess. Striations are formed on the surface of the recess and act as a light-diffusing means. The housing is secured to the interior wall of the bin, and electrical leads emerge from the bin for connection to exteriorly located bin level response and control apparatus.

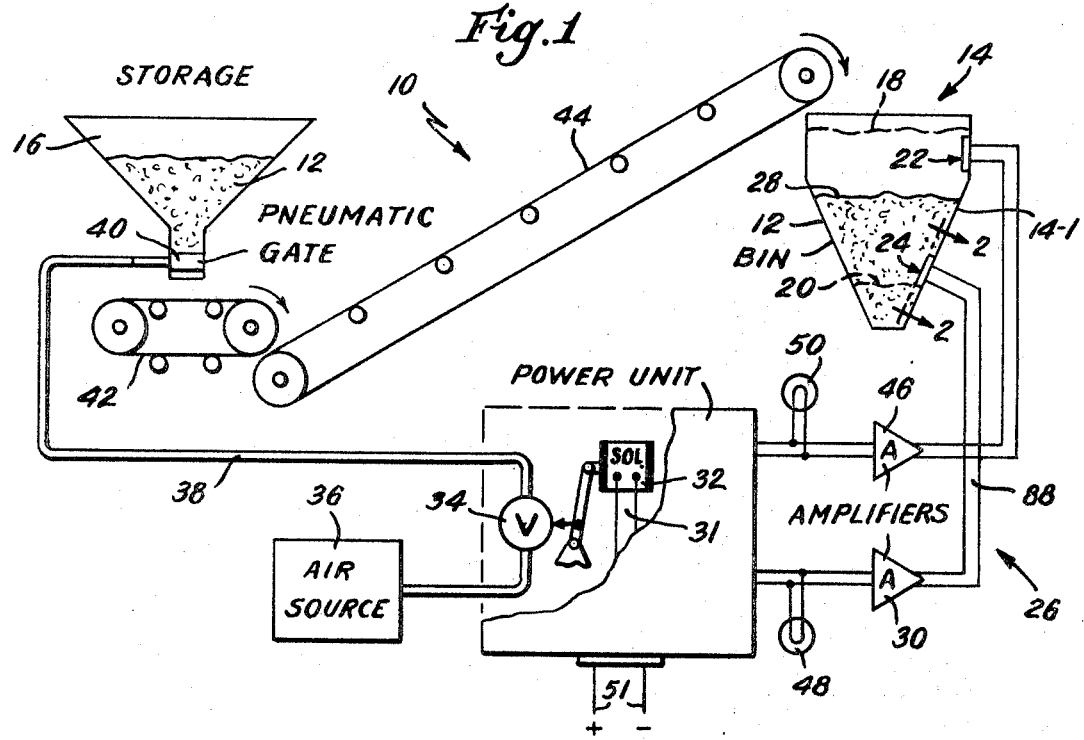
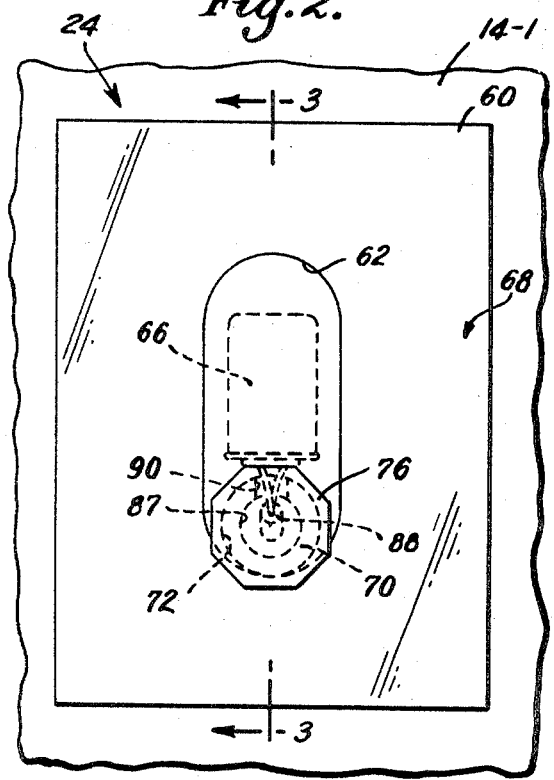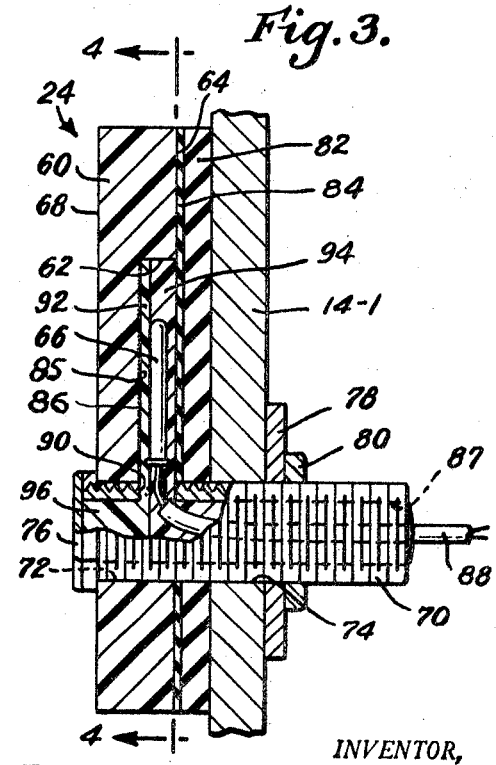

PATENTED JAN 5 1971

INVENTOR,
Robert J. Maigret,
BY
Salter & Nicholson
Att'ys.

AMBIENT-LIGHT-OPERATED BIN-LEVEL CONTROL SYSTEM HAVING TRANSPARENT PHOTOCELL HOUSING

BACKGROUND OF THE INVENTION

The invention has application to bin-level sensing and relates particularly to a photoelectric sensor that is responsive to ambient light. In many continuous materials-handling processes, there is a need for devices which sense the level of material within a bin, where that level is subject to variation as material is added to the bin or removed therefrom. A variety of sensing devices have been suggested for this purpose, but these have been unsatisfactory for a number of reasons. Some approaches of the prior known devices have incorporated the use of diaphragms, paddle wheels or pendulums, but these mechanical approaches were found to be objectionable since they were subject to fatigue, wear, moisture, and in particular did not operate satisfactorily when the material in the bin produced excessive dust, or was subject to freezing conditions such as encountered in certain outdoor applications. These mechanisms were also difficult to mount, and required critical and frequent adjustment in order to function properly. Ultrasonic sensing has also been tried, but this type of device was also difficult to mount and did not function properly under freezing conditions. In those situations where the temperature of the material in the bin varied from ambient, temperature-sensing devices have also been employed to determine the presence or absence of the material, but these devices have not been totally reliable.

The most effective approach to the problem of bin-level sensing is in the use of a photoelectric sensing device that determines whether light traveling toward a photocell has been blocked by opaque material within the bin. However, the photoelectric detection systems heretofore have involved the use of artificial light sources within the bin, these sources incorporating directional beams of light carefully adjusted and focused so as to strike the photoelectric detector along a particular path of incidence. This prior known "target" type of system was not entirely effective due to problems of mounting, aligning, and adjusting of the sensing device.

Moreover, in target type systems the photoelectric detector and its output circuit were adjusted so as to respond only to a bright artificial light source, and not to the lower level of ambient illumination. As a result, when accumulated dust from the material within the bin reduced the effective light reaching the detector, the system required adjustment to such a high threshold that a false indication resulted. Furthermore, a target type photoelectric system might produce a misleading signal if the level of the material in the center of the bin was higher than the average level of the surrounding material.

SUMMARY OF THE INVENTION

The overall objective of the present invention is to provide an improved system and apparatus for photoelectric bin level sensing. In particular, the invention provides a photoelectric sensor which operates by ambient light, and which is relatively immune to the effects of dust, as well as completely exempt from any requirement for focusing, alignment or adjustment.

Another object of the invention is to provide a sensor which is relatively easy to mount within the bin. In particular, installing an artificial light source within the bin in addition to the sensor itself is avoided. Furthermore, the level of standby power consumption is greatly reduced owing to the fact that it is no longer necessary to maintain continuous artificial illumination.

In addition to the operation by means of ambient light, the particular construction of the sensor employed is novel and has significant advantages. The sensor comprises a transparent housing having a recess formed therein, a photoresponsive device being located within the recess. Irregularities are formed on a surface of the housing and are adapted to scatter a fraction of the ambient light toward the photoresponsive device and from the housing for connection to bin level response and control apparatus, and means are provided for securing the housing to the interior surface of the bin wall. Additional novel features of construction will be brought out in the ensuing description, and particularly set forth in the appended claims.

DESCRIPTION OF THE DRAWINGS

In the drawings which illustrate the best mode presently contemplated for carrying out the present invention:

FIG. 1 is a diagrammatic illustration of the bin level sensing and controlling system embodied in the present invention;

FIG. 2 is a front elevational view of an individual bin level sensor that is employed in the system illustrated in FIG. 1;

FIG. 3 is a sectional view, taken along lines 3–3 of FIG. 2;

DESCRIPTION OF THE INVENTION

Figure 4:
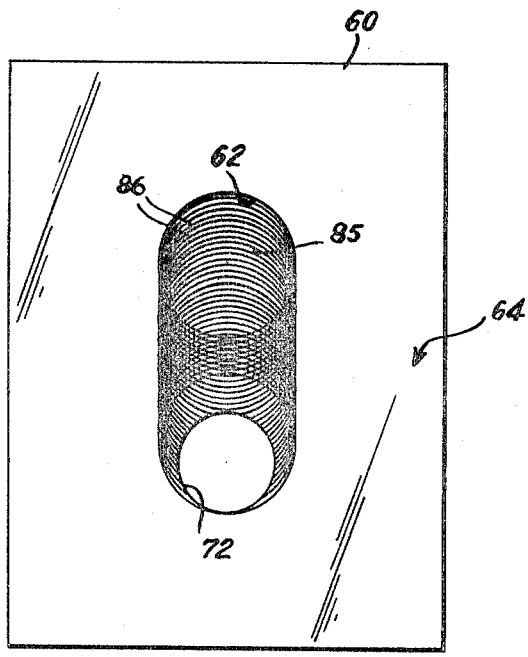
FIG. 4 is a sectional view, taken along the lines 4–4 of FIG. 3.

Referring now to the drawings and particularly to FIG. 1, a system generally indicated at 10 is illustrated and as shown is adapted to control the level of material 12 in a bin 14. The material 12 is periodically removed by any conventional method from the lower end of bin 14 as required. As the level of material in the bin is lowered by such periodic withdrawals, additional material 12 must be brought from a storage hopper 16 and loaded through the upper end of the bin 14 to maintain the level of material 12 therein. In particular, it is desired that the delivery of new material 12 to the bin 14 be terminated when the material rises to an upper limit 18, and resumed when the level falls to a lower limit 20.

In order to monitor the level of material 12 within the bin 14, a photoelectric sensor device generally indicated at 22 is mounted on the interior surface of the wall 14-1 of the bin 14 adjacent to the upper level 18, and a similar photoelectric device generally indicated at 24 is mounted on an interior surface of the wall bin 14-1 adjacent to the lower limit 20. A response circuit generally designated at 26 is electrically connected to the outputs of the photoelectric sensor devices 22 and 24, and controls the delivery of material from the storage hopper 16 in accordance with the conditions that are indicated by the photoelectric sensors. When the level of member 12 in the bin 14 is at an intermediate level, for example, at level 28, between the upper limit 18 and the lower limit 20, then the photoelectric sensor 22 is illuminated by ambient light due to the absence of material 12 at level 18, and sensor 24 is 18 because it is occluded by the material 12 above the level 20. Since the sensor 22 is conditioned to produce a signal when it is occluded by the material and the sensor 24 produces a signal only when it is uncovered, the response circuit 26 remains quiescent. When the level of material 12 drops to level 20, however, the lower photoelectric sensor 24 is illuminated by ambient light and its output, boosted by an amplifier 30, energizes a circuit 31 which operates a solenoid 32. The solenoid, in turn, opens a valve 34 which allows air under pressure from a source 36 to proceed through a conduit 38 to activate a pneumatic gate 40 which allows the material 12 to be dumped through the lower outlet of the storage hopper 16. The material dropped from the storage hopper is transported by a horizontal conveyor 42 to an elevator 44 which then deposits the material 12 in the upper end of the bin 14. This loading process continues until the level of the material 12 within the bin 14 rises to the upper limit 18, at which point the upper photoelectric sensor 22 is occluded and darkened by the material. When this occurs, the output of sensor 22, boosted by an amplifier 46, is applied to circuit 31 which then deenergizes the solenoid 32. As a result the valve 34 is shut off, and the compressed air from source 36 is no longer available to hold open the pneumatic gate 40. The gate then closes, terminating the flow of material 12 to the conveyor 42, elevator 44, and bin 14.

A pair of pilot lamps 48 and 50 are provided to indicate the state of the response circuit 26. When pilot lamp 48 is energized, this indicates that the response circuit 26 is calling for more material 12 to be added to the storage bin 14. When the pilot lamp 50 is energized, that indicates that the response device 26 is no longer calling for additional material 12 to be added to the bin 14. Power for the circuit 26 is provided by lines 51.

In accordance with this invention the sensors 22 and 24 respond to ambient light, i.e., a level of illumination within the bin 14 which is due solely to a source of light, either natural or artificial, which is located outside the bin and is not preferentially directed toward the sensors 22 or 24, In addition the threshold level of illumination of the sensors 22 and 24, which the response circuit 26 is able to distinguish from total darkness, is adjusted so that it is not greater than the illumination level which would normally be produced within the bin 14 under conditions of relatively weak daylight, for example late dusk on a cloudy day.

In the past, photoelectric bin level sensing systems of the general type illustrated in FIG. 1 employed an artificial light source mounted within the bin 14 and aimed at an accompanying photoelectric sensor in a highly directional manner. This type of system sensed the interruption of a highly directional beam of light by the material 12 within the bin 14. Therefore the system was set to discriminate between a relatively low ambient light level, and a relatively high illumination level produced by the directional light beam. To put the matter another way, the system was deliberately made relatively insensitive, so that only a "direct hit" by the directional light beam of the artificial light source would exceed the threshold of response, and ambient light levels would not exceed the threshold of response. As a result of this insensitivity, such systems were prone to malfunction when layers of dust from the material 12 occasionally accumulated on the artificial light source or on the photoelectric sensor to which it was coupled. These prior art systems required additional equipment, i.e., the artificial light source, and the light source consumed substantial amounts of power, of the order to tens of watts as is usual with such devices. In addition, the light source required additional labor to install it within the bin 14, and for occasional replacement thereof. Moreover, it required fairly careful alignment and focusing so that it was directed narrowly and accurately at its intended photoelectric sensor. Another disadvantage was the fact that the artificial light source took up space in the bin 14 which might otherwise have been devoted to additional quantities of the material 12. Furthermore, the artificial light source required the running of power lines thereto, which was an inconvenience and presented a shock hazard. In addition, the light beam was occasionally interrupted by random peaks of material 12 projecting above the average level in the bin 14.

The present invention provides self-contained, independent photoresponsive devices 22 and 24 which operate solely on ambient light; therefore, the system 10 can be made sufficiently sensitive to distinguish between dark conditions (when either sensor 22 or 24 is occluded by the material 12) and the presence of even low levels of ambient illumination resulting from weak levels of daylight. The system also works with artificial light sources which are situated outside the bin 14 and which bathe the entire area around the bin 14 with light, rather than being mounted within the bin 14 and focused preferentially on either the sensor 22 or 24.

In addition, the specific construction of the ambient light sensors 22 and 24 is novel and advantageous. In FIGS. 2 through 4, which provide detailed views of either one of the sensors, for example, the sensor 24, it is seen that each sensor comprises a rectangular block of transparent material which comprises a housing 60. The material of the housing is preferably polymethyl methacrylate, also known as Lucite or Plexiglas, or any other suitable transparent material which is easily formed into the desired shape. The housing 60 is formed with a recess 62 milled in the rear wall 64 thereof. Within the recess 62 is disposed a conventional, highly sensitive, miniature solid state photoresponsive cell 66 of a type which is now commercially available. The shape of the recess 62 is preferably elongated as seen in FIG. 2 to accommodate the length of the photocell 66. However, it is fairly shallow in thickness as seen in FIG. 3, since little depth is required to accommodate the relatively thin photocell 66.

Sensor 24 is mounted on an interior surface of the wall of bin 14, with the front face 68 of housing 60 facing the interior of the bin, and the rear face 64 oriented toward the adjacent wall 14–1 of the bin 14. Mounting is accomplished by means of a bolt 70 comprising a short length of hollow pipe having a threaded exterior. The mounting bolt 70 passes through a bore 72 formed in the housing block 60 adjacent to the lower end of the recess 62, and also extends through an opening 74 cut through the wall 14–1 of the bin 14. The mounting bolt 70 extends a short distance forwardly from the front face 68 of housing 60 and has a cap 76 which is threaded thereon to retain the bolt 70 against withdrawal in a rearward direction. The rear portion of the bolt extends some distance beyond the wall 14–1 on the outside surface thereof, and is engaged by a washer 78 and a holding nut 80 on the outside surface of the wall 14–1.

A gasket 82 composed of an opaque resilient material, for example black silicone rubber, is secured to the rear face 64 of housing 60 by means of a layer of cement 84. The mounting bolt 70, in cooperation with the threaded cap 76 inside the bin 14 and the washer 78 and holding nut 80 outside the bin 14, serves to hold the sensor housing 60 and its contents in place on the interior surface of the wall 14–1, while the gasket 82 provides an excellent mechanical and optical interface between the sensor housing 60 and the wall 14–1. In particular, the rubber gasket 82 gives the sensor 24 a high friction grip against the interior surface of the wall 14–1, so that it does not turn when the holding nut 80 is threaded and tightened onto the mounting bolt 70.

So far as the optical design of the sensor 24 is concerned, what is desired is that the sensor 24 respond to ambient light coming from any point within the bin 14, i.e., light arriving along any and all paths of incidence. Accordingly, the housing 60 is made of a transparent material as previously mentioned, so as to transmit incident ambient light through the body of the housing 60 to reach the photocell 66 within the recess 62. In addition, striations 86 (see FIG. 3) are formed on the front wall 85 of the recess 62 (see FIG. 2). These striations 86 serve to scatter incident light in random directions, so that a fraction of the ambient light striking the surface 85 will always be scattered in the direction of the photocell 66, regardless of its original angle of incidence. Since the photocell 66 and the response circuit 26 are set to respond sensitively to low threshold levels of illumination, the system can function even though only a small fraction of a relatively low ambient illumination level actually strikes the photocell.

The striations 86 may be of any particular pattern which has the affect of randomly scattering light, but they are shown in the particular illustration of FIG. 4 as a series of circular whirls or grooves simply because that is the easiest configuration to form in the wall 85 by a milling cutter.

It is essential that light be prevented from filtering through the hole 74 in the wall 14–1 of the bin 14, since otherwise the sensor 24 would respond to conditions exterior of the bin. In this respect, the opaque gasket 82, the washer 78, and the holding nut 80, combine to act as a light baffle which prevents the leakage of external light through the opening 74 in the wall 14–1.

The hollow interior of the mounting bolt 70 further provides a convenient conduit for withdrawing the electrical leads 88 of the photocell 66 exteriorly of the bin 14. A small hole 90 is drilled from the upper surface of the mounting bolt 70 through to the central bore 87 of the mounting bolt. The hole 90 and bore 87 together comprise an interior passageway for the electrical leads 88, which are seen to pass downwardly through the hole 90 and horizontally out through the bore 87. In this way the leads 88 are allowed to emerge from the recess 62 and the housing 60, and are accessible from outside the bin 14.

As seen in FIG. 3, during the manufacture of the photoelectric sensor 24 a layer of transparent potting material 92, such as epoxy or any other clear substance having similar properties, is applied over the front wall 85 of the recess 62 to space the photocell 66 from the surface 85. Then the photocell is inserted into the recess 62 from the rear side of the housing 60 and placed against the epoxy layer 92. At this point, the leads 88 are inserted through the hole 90 into the interior bore 87 of the mounting bolt 70, and brought out through the rear of the bolt. Subsequently, a second layer of epoxy material 94 is applied to fill up the remaining volume of the recess 62, so that the photocell 66 is solidly potted therein. The second epoxy layer 94 need not be transparent since it does not overlie the front surface of the photocell 66. Epoxy material 96 is also inserted through the rear of the mounting bolt bore 87, so as to pot the emerging leads 88 within the hole 90 and a portion of the bore 87. This contributes further to the ruggedness and vibration resistance of the sensor 24.

Figure 5:
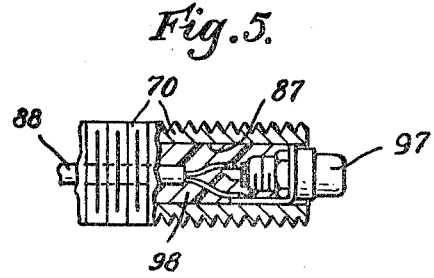
FIG. 5 is a sectional view of an alternative embodiment of an electrical termination for the bin level sensor.

FIG. 5 illustrates an alternative electrical termination for the leads 88 at the rear of the mounting bolt 70. These leads can be soldered to a plug jack 97 which is force fitted within the read end of the bore 87 and embedded within a mass of additional epoxy material 98 previously inserted to fill the entire volume of the bore 87. This type of electrical termination is particularly convenient because of its quick disconnect capability, yet it carries through the rugged design concept of the embodiment previously discussed.

It will now be appreciated that the present invention provides a photoelectric bin sensor and sensing system which has numerous advantages over other approaches, and even over prior art photoelectric systems. The device is also rugged, compact, economical to manufacture, easy to install and wire to the appropriate response circuit, and needs little maintenance.

Since the foregoing description and drawings are merely illustrative, the scope of protection of the invention has been more broadly stated in the following claims, and these should be liberally interpreted so as to obtain the benefit of all equivalents to which the invention is fairly entitled.

I claim:

1. Ambient-light-operated bin-level sensing apparatus for use in sensing and maintaining the level of a dry bulk material in a storage bin, a transparent housing mounted on an interior wall of said bin in a preselected position and having an interior surface that is directed toward the interior wall of said bin and a generally flat exterior surface that has open communication with the interior of the bin, said housing having a recess formed therein that communicates with the interior surface thereof, a mounting member fixed to said housing and extending rearwardly thereof through an opening in the bin wall, a photoresponsive device communicating with said recess and having electrical connections joined thereto that project through said mounting member for access exteriorly of said bin, means for securing said mounting member in said transparent housing, means cooperating with said mounting member exteriorly of said bin wall for fixing said housing to the interior of said wall in substantially flush relation therewith so as to locate the exterior surface of said housing in open communication with the bin interior and in that position whereby accumulation of the dry bulk material thereon is prevented, and means responsive to the photoresponsive device in response to ambient light transmitted through the transparent housing in accordance with the level of said dry bulk material in said bin for controlling flow of said material into said bin.

2. A Sensing apparatus as set forth in claim 1, said mounting member having an interior passageway formed therein through which said electrical connections project, and a potting material embedding and securing said electrical connections in said interior passageway.

3. Sensing apparatus as set forth in claim 1, the axis of said mounting member being generally perpendicular to the surfaces of said housing, said fixing means engaging said mounting member exteriorly of the bin wall, thereby forcing the housing into substantially flush relation on the interior wall of said bin.

4. Sensing apparatus as set forth in claim 1, a second photoresponsive device mounted on the interior wall of said bin in a second preselected position, one of said photoresponsive devices being operable in response to the presence of ambient light and the other photoresponsive device being operable in the absence of ambient light, wherein said one device determines when material is to be added to said bin and the other device determines when the flow of material into said bin is to be discontinued.

5. Sensing apparatus as set forth in claim 1, a resilient gasket located between the interior surface of said housing and the interior of said bin wall.

6. Sensing apparatus as set forth in claim 1, said mounting member comprising a bolt protruding from the rear surface of said housing and extending through an opening in the bin wall, and a fastening element for securing said bolt together with said housing to the bin wall.

7. Sensing apparatus as set forth in claim 6, said electrical connections extending through said bolt exteriorly of said bin, and potting material embedded in said bolt for fixing said electrical leads therein and for preventing accumulation of moisture in and around said electrical connections and the photoresponsive device.